US012491073B2

(12) United States Patent
Lapointe et al.

(10) Patent No.: US 12,491,073 B2
(45) Date of Patent: Dec. 9, 2025

(54) PIVOT FASTENER FOR BONE/CRANIOPLASTY IMPLANTS AND PROSTHESIS

(71) Applicant: EncephalX Inc., Sherbrooke (CA)

(72) Inventors: Simon Lapointe, Sherbrooke (CA); Christian Iorio-Morin, Sherbrooke (CA); Marc-André Hachey, Sherbrooke (CA); Marianne Dudemaine, Sherbrooke (CA)

(73) Assignee: EncephalX Inc., Sherbrooke (CA)

( * ) Notice: Subject to any disclaimer, the term of this patent is extended or adjusted under 35 U.S.C. 154(b) by 0 days.

(21) Appl. No.: 19/274,719

(22) Filed: Jul. 21, 2025

(65) Prior Publication Data

US 2025/0345176 A1    Nov. 13, 2025

Related U.S. Application Data

(63) Continuation of application No. 18/987,792, filed on Dec. 19, 2024.

(60) Provisional application No. 63/635,847, filed on Apr. 18, 2024, provisional application No. 63/613,981, filed on Dec. 22, 2023.

(51) Int. Cl.
*A61F 2/28*    (2006.01)
*A61B 17/80*    (2006.01)

(52) U.S. Cl.
CPC ........ *A61F 2/2875* (2013.01); *A61B 17/8085* (2013.01); *A61B 17/8004* (2013.01); *A61F 2220/0016* (2013.01); *A61F 2230/0067* (2013.01); *A61F 2230/0069* (2013.01); *A61F 2250/0039* (2013.01)

(58) Field of Classification Search
CPC ............ A61F 2/2875; A61F 2002/3055; A61F 2002/30565; A61F 2002/30576; A61F 2002/30578; A61F 2002/30579; A61B 17/688; A61B 17/80; A61B 17/8004; A61B 17/8014; A61B 17/8023; A61B 17/8061; A61B 17/8085
See application file for complete search history.

(56) References Cited

U.S. PATENT DOCUMENTS 2,580,821 A * 1/1952 Toufick .............. A61B 17/8085
606/105
4,524,765 A    6/1985 de Zbikowski
(Continued)

FOREIGN PATENT DOCUMENTS

CA         2736775 A1    3/2010
CN       106999215 A    8/2017
(Continued)

*Primary Examiner* — Sarah W Aleman
(74) *Attorney, Agent, or Firm* — NORTON ROSE FULBRIGHT CANADA LLP (57) ABSTRACT

An assembly comprising a cranioplasty prosthesis component having a connection hole(s). A pivot fastener may have a body being threaded and adapted to be screwed to cranium bone. A shoulder is between the body and a head of the pivot fastener, the shoulder having a circular section. A diametrical dimension of the circular section is less than a diametrical dimension of the connection hole, such that the shoulder forms a rotational joint with the cranioplasty component when the shoulder is in the connection hole.

20 Claims, 8 Drawing Sheets

(56) References Cited

U.S. PATENT DOCUMENTS

| | | | |
|---|---|---|---|
| 5,468,242 A * | 11/1995 | Reisberg | A61B 17/8085 606/151 |
| 5,578,036 A * | 11/1996 | Stone | A61B 17/8085 606/281 |
| 5,752,958 A * | 5/1998 | Wellisz | A61B 17/8085 606/280 |
| 5,766,176 A * | 6/1998 | Duncan | A61B 17/8085 606/281 |
| 5,797,914 A | 8/1998 | Leibinger | |
| 6,093,188 A * | 7/2000 | Murray | A61B 17/8085 606/285 |
| 9,517,097 B2 * | 12/2016 | Rise | A61B 17/8004 |
| 9,757,154 B2 | 9/2017 | Donner et al. | |
| 10,111,752 B2 | 10/2018 | Howard et al. | |
| 10,675,059 B2 | 6/2020 | Dirisio et al. | |
| 11,083,508 B2 | 8/2021 | Kuhn | |
| 2005/0137598 A1 | 6/2005 | Auth | |
| 2007/0083206 A1 | 4/2007 | Du | |
| 2007/0270859 A1 | 11/2007 | Companioni et al. | |
| 2011/0028972 A1 | 2/2011 | Khanna | |
| 2012/0165879 A1 | 6/2012 | Khanna | |
| 2012/0203284 A1 * | 8/2012 | Khanna | A61B 17/8004 606/286 |
| 2012/0277748 A1 * | 11/2012 | Trescony | A61B 17/80 606/70 |
| 2013/0018425 A1 * | 1/2013 | Seldin | A61B 17/8019 606/286 |
| 2013/0310882 A1 | 11/2013 | Whitmore | |
| 2020/0197046 A1 * | 6/2020 | Khanna | A61B 17/8085 |
| 2021/0059720 A1 | 3/2021 | Jiang | |
| 2021/0137575 A1 | 5/2021 | Epperly et al. | |

FOREIGN PATENT DOCUMENTS

| | | |
|---|---|---|
| CN | 214073552 U | 8/2021 |
| CN | 216629417 U | 5/2022 |
| EP | 0195455 A1 | 9/1986 |
| FR | 2254298 A1 | 7/1975 |
| JP | 4358726 B2 | 11/2009 |
| JP | 2019516481 A | 6/2019 |
| KR | 101259412 B1 | 5/2013 |
| WO | 9827883 A1 | 7/1998 |
| WO | 2008131369 A1 | 10/2008 |
| WO | 2012082571 A2 | 6/2012 |
| WO | 2022068118 A1 | 4/2022 |

* cited by examiner

PIVOT FASTENER FOR BONE/CRANIOPLASTY IMPLANTS AND PROSTHESIS

CROSS-REFERENCE TO RELATED APPLICATION

The present application is a continuation of U.S. patent application Ser. No. 18/987,792 filed on Dec. 19, 2024 which claims the priorities of U.S. Patent Application No. 63/613,981, filed on Dec. 22, 2023, and of U.S. Patent Application No. 63/635,847, filed on Apr. 18, 2024, the entire contents of both of which are incorporated herein by reference.

TECHNICAL FIELD

The present application pertains to implants, attachment devices, fixation plates, plating systems, and/or prostheses used in surgical procedures such as craniotomies, craniectomies and/or cranioplasties, orthopedic, as examples among others, and to fasteners used with such devices and with implants.

BACKGROUND

Various types of implanted medical devices have been developed to interconnect bone portions to one another, with some of such implanted medical devices enabling some movement between the bone portions. For example, a craniotomy is a procedure by which a bone flap is temporarily removed to access part of a brain, blood vessels or like soft tissue within the skull. In a craniotomy, the bone flap is reimplanted at the end of the procedure, before skin closure. A craniectomy is a procedure by which the bone flap is permanently removed from a remainder of the skull.

Dynamic systems have been developed to allow bone flaps to move and expand the intracranial volume, thereby allowing a "decompressive craniotomy". The dynamic systems may typically include telescopic or spring-based expansion. However, such systems may be voluminous and may exhibit unnecessary resistance to bone flap or prosthesis movement, thereby providing insufficient decompression. Moreover, dynamic systems voluminous in nature may be unesthetic in that they may create lumps on one's head. Likewise, dynamic systems used in other procedures, such as in distraction surgery, may also be voluminous.

SUMMARY

In a first aspect, there is provided an assembly comprising a prosthesis component having at least one connection hole; and a pivot fastener, the pivot fastener having a body adapted to be received in bone, a head, and a shoulder between the body and the head, the shoulder having a circular section; wherein a diametrical dimension of the circular section is less than a diametrical dimension of the connection hole, such that the shoulder forms a rotational joint with the prothesis component when the shoulder is in the connection hole.

Further in accordance with the first aspect, for instance, the shoulder has a pivot segment adjacent to the head, and an abutment portion adjacent to the body.

Still further in accordance with the first aspect, for instance, the pivot segment has a cylindrical shape.

Still further in accordance with the first aspect, for instance, the abutment portion is an abutment segment.

Still further in accordance with the first aspect, for instance, the abutment segment has a tapering shape tapering toward the body.

Still further in accordance with the first aspect, for instance, a diameter of a base of the tapering shape is equal to a diameter of the pivot segment at a junction between the base and the pivot segment.

Still further in accordance with the first aspect, for instance, the tapering shape is a frustoconical shape.

Still further in accordance with the first aspect, for instance, the abutment segment has a tapering angle of at most 45 degrees inclusively, and is more than 0 degree.

Still further in accordance with the first aspect, for instance, the tapering shape is a frustospherical shape.

Still further in accordance with the first aspect, for instance, the head has a diameter greater than a maximum diameter of the shoulder, the head received in a counterbore of the connection hole of the prosthesis component.

Still further in accordance with the first aspect, for instance, an undersurface of the head has a tapering shape tapering toward the shoulder.

Still further in accordance with the first aspect, for instance, the body has a frustoconical shank portion supporting at least one thread.

Still further in accordance with the first aspect, for instance, the shoulder has a diameter that is 1.00 mm±0.25 mm greater than a maximum diameter of the shank.

Still further in accordance with the first aspect, for instance, the body has a conical tip.

Still further in accordance with the first aspect, for instance, the body is threaded and the head has a drive.

Still further in accordance with the first aspect, for instance, the prosthesis component is an attachment device having a body defined from a sheet material and including: a first connection end having at least one said connection hole configured to cooperate with one said pivot fastener to anchor the attachment device to a bone flap or prosthesis covering at least part of an opening in a skull, a second connection end having at least another one of said connection hole configured to cooperate with another one of said pivot fastener to anchor the attachment device to the skull adjacent to the opening in the skull, a frame portion extending from the first connection end, and a coil portion between the frame portion and the second connection end, the coil portion having struts configured for deforming in flexion, and webs between the struts configured for deforming in torsion, wherein the frame portion is configured to be located over a periphery of the opening in the skull to block inward movement, and wherein the coil portion enables an out-of-plane deformation of the attachment device for the first connection end to move out of a neutral plane with the second connection end.

Still further in accordance with the first aspect, for instance, the body extends lengthwise from the first connection end to the second connection end, with at least some of the struts extending at least partially lengthwise.

Still further in accordance with the first aspect, for instance, the prosthesis component is an attachment device having a body defined from a sheet material and including: a first connection end having at least one hole configured to receive a fastener to anchor the attachment device to a first bone portion, a second connection end having at least one said connection hole configured to cooperate with one said pivot fastener to anchor the attachment device to a second bone portion, a frame portion extending from the first connection end, and a coil portion between the frame portion and the second connection end, the coil portion having struts configured for deforming in flexion, and webs between the struts configured for deforming in torsion, wherein the frame portion is configured to be located over a separation or epiphyseal line between the first bone portion and the second bone portion, and wherein the coil portion enables a deformation of the attachment device for the first connection end to expand in a plane.

Still further in accordance with the first aspect, for instance, the frame portion is a straight segment.

Still further in accordance with the first aspect, for instance, the at least one hole in the first connection end is at least one of said connection hole configured to cooperate with one said pivot fastener.

DESCRIPTION OF THE DRAWINGS

Reference is now made to the accompanying figures in which.

DETAILED DESCRIPTION

Figure 1:
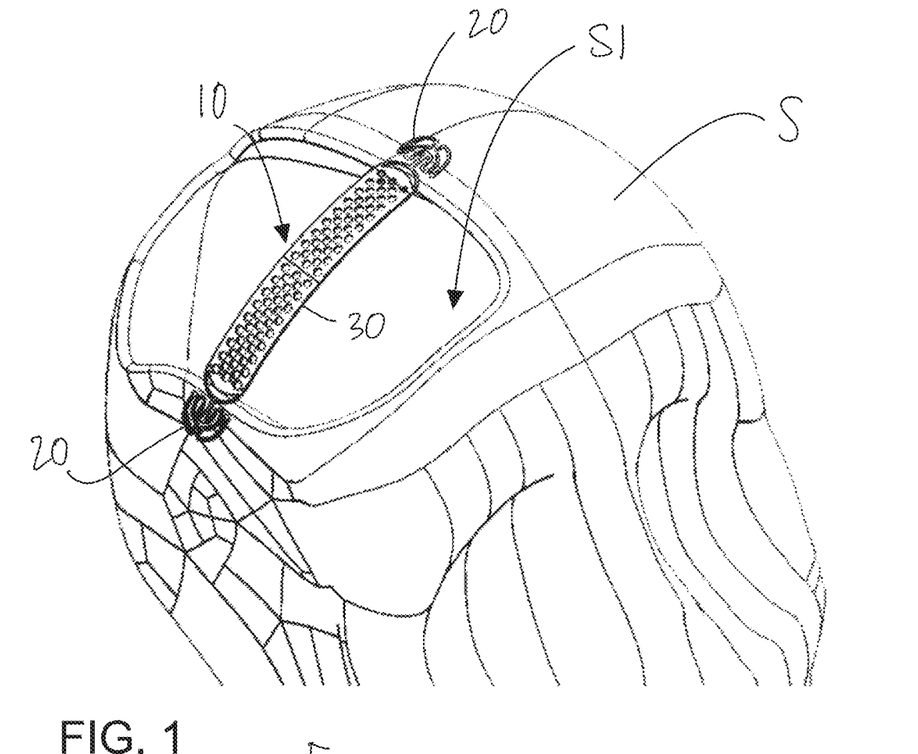
FIG. 1 is a perspective view of a cranioplasty prosthesis relative to an opening in a skull using pivot fasteners in accordance with an embodiment of the present disclosure.

Referring to the drawings and more particularly to FIG. 1, there is illustrated a cranioplasty prosthesis that may use a pivot fastener F in accordance with the present disclosure at 10, as one possible use among others of the pivot fastener F. The cranioplasty prosthesis 10, attachment devices 20, and prosthetic blade 30 described herein may be in accordance with those described in PCT patent application publication no. WO2023/070200, filed on Oct. 25, 2022 and incorporated herein by reference. The cranioplasty prosthesis 10 is shown spanning across an opening S1 in a skull S. The opening S1 may result from a craniectomy procedure, for example. For simplicity, a single cranioplasty prosthesis 10 is shown and therefore only partially covers the opening S1 in the skull S but a plurality of the cranioplasty prosthesis 10 could be used in a side-by-side arrangement.

The cranioplasty prosthesis 10 is of the type that is used to temporarily or permanently cover the opening S1, for instance pursuant to a craniectomy procedure or a craniotomy procedure. The expression "cranioplasty" is used as a moniker for the prosthesis 10 in that the prosthesis 10 serves to cover the opening S1 in the skull S. While the use of the cranioplasty prosthesis 10 is described in a context of craniotomy, craniectomy, or cranioplasty, it may be used in other circumstances as well.

The cranioplasty prosthesis 10 is shown as being made of a pair of the attachment devices 20 at opposite ends of the prosthetic blade 30, in accordance with a variant of the present disclosure. The attachment devices 20 may be deformable to allow an adjustment of the prosthetic blade 30 relative to the skull S, while the prosthetic blade 30 defines the structural component of the cranioplasty prosthesis 10 that acts as a temporary or permanent skull shell portion to cover the opening S1. The prosthetic blade 30 may also be made of a shapeable material, such as a metallic plate, such that the prosthetic blade 30 may be shaped into a given curvature in continuity with the surrounding cranium surfaces, while providing suitable impact resistance to protect the brain. In the illustrated embodiment of FIGS. 1 to 2, the attachment devices 20 and the prosthetic blade 30 are monoblock in construction. For example, the attachment devices 20 and the prosthetic blade 30 may be made of a single sheet of material that may be cut in any appropriate way, such as by laser cutting, CNC machining, casting, etc. It is also possible to mechanically attach the attachment devices 20 to the prosthetic blade 30 so as to have three components, separable from one another. For example, the attachment devices 20 may be secured to the prosthetic blade 30 by screws, by welding, by glueing, etc. The attachment devices 20 may also be used as fixations for bone flaps, i.e., with the prosthetic blade 30.

In accordance with a variant of the present disclosure, the cranioplasty prosthesis 10 may have a single one of the attachment device(s) 20, i.e., only at one end of the prosthetic blade 30, with the prosthetic blade 30 anchored directly to the skull at the other end. In accordance with another variant, the prosthetic blade 30 may be used without the attachment device 20, with other securement means provided to anchor the prosthetic blade 30 to the skull S, such as screws. Such prosthetic blade 30 may not allow a dynamic adjustment of shape at the coverage of the opening S1, for instance to address intracranial pressure concerns, but may nevertheless form a prosthetic flap that provides suitable structural integrity. Moreover, the prosthetic blade 30 may be shaped into a given geometry to match surrounding outer cranium surfaces, while also relieving some pressure due to their thinness in comparison to bone flaps.

Figure 2:
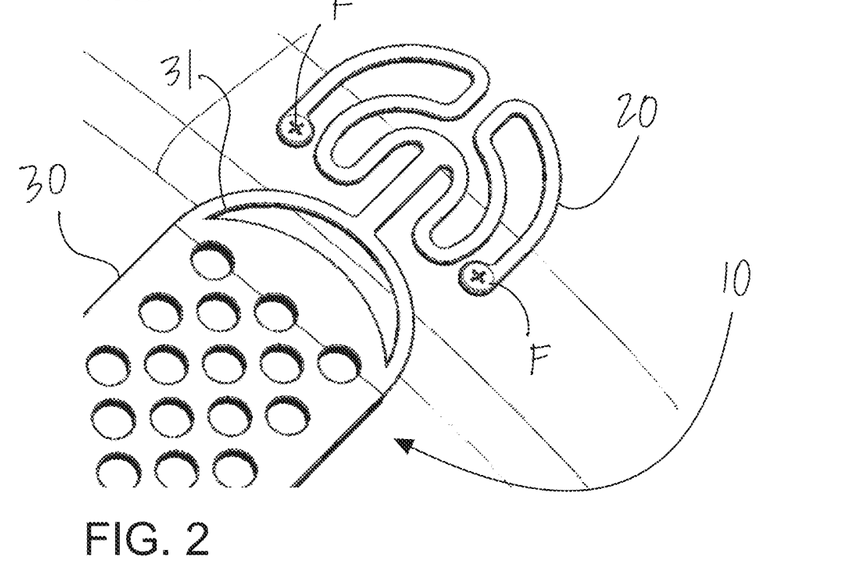
FIG. 2 is an enlarged view of an end of the cranioplasty prosthesis of FIG. 1.

An enlarged view is provided in FIG. 2 to illustrate that the attachment device 20 may be secured to the bone of the skull by way of pivot fasteners F in accordance with a variant of the present disclosure. The planar body of the cranioplasty prosthesis 10 may be made of a biocompatible material or of a combination of materials, such as a metal or a polymer. For example, titanium is well suited to be used to define the cranioplasty prosthesis 10, such as titanium in a sheet format. The material is a rigid material but may exhibit some flexibility due to its limited thickness. Therefore, the cranioplasty prosthesis 10 may have portions deformable out of a flat plane (e.g., when the cranioplasty prosthesis 10 is made from a sheet). The deformation may be in the elastic deformation range and may also reach plastic deformation, for example to match a shape of surrounding outer cranium surfaces. Due to the use of a rigid material, and the width and length substantially greater than the thickness, in-plane deformation may not be possible, i.e., deformation while the cranioplasty prosthesis 10 remains planar. However, as described below, the pivot fasteners F collaborate with other parts of the cranioplasty 10 to allow some in-plane deformation. The cranioplasty prosthesis 10 may also oppose to any buckling by its configuration.

The out-of-plane deformation of the prosthetic blade 30 may allow a user to manually define a shape of the prosthetic blade 30, for instance to emulate a geometry of the bone flap that is removed. In a variant, the shape may be obtained by applying the prosthetic blade 30 against a target site of the skull S, before craniectomy. Instruments may optionally be used to shape the blades 30. Measuring instruments, that may for example emulate the shape of the skull, may be used to obtain physical shape representations. Blades 30 of different length may be put side by side, to customize a shape of a flap constituted of numerous blades 30. The elongated nature of the blades 30, whether or not part of the cranioplasty prosthesis 10, may facilitate their insertion in a small incision, for example with endoscopic maneuvers. A single incision, sized based on the width of a single blade 30, may be used for the insertion of all blades 30, when numerous blades are used. Moreover, the rounded ends of the blades 30, though optional, are without corners and hence reduce risks of catching surrounding soft tissue when the blades 30 are slid into position if used in minimally invasive surgery, for instance by a pushing movement on the trailing end of the blades 30 or of the cranioplasty prosthesis 10. Other tapering shapes are considered for the blades 30, in addition to the hemi-circular end geometry shown.

Figure 3:
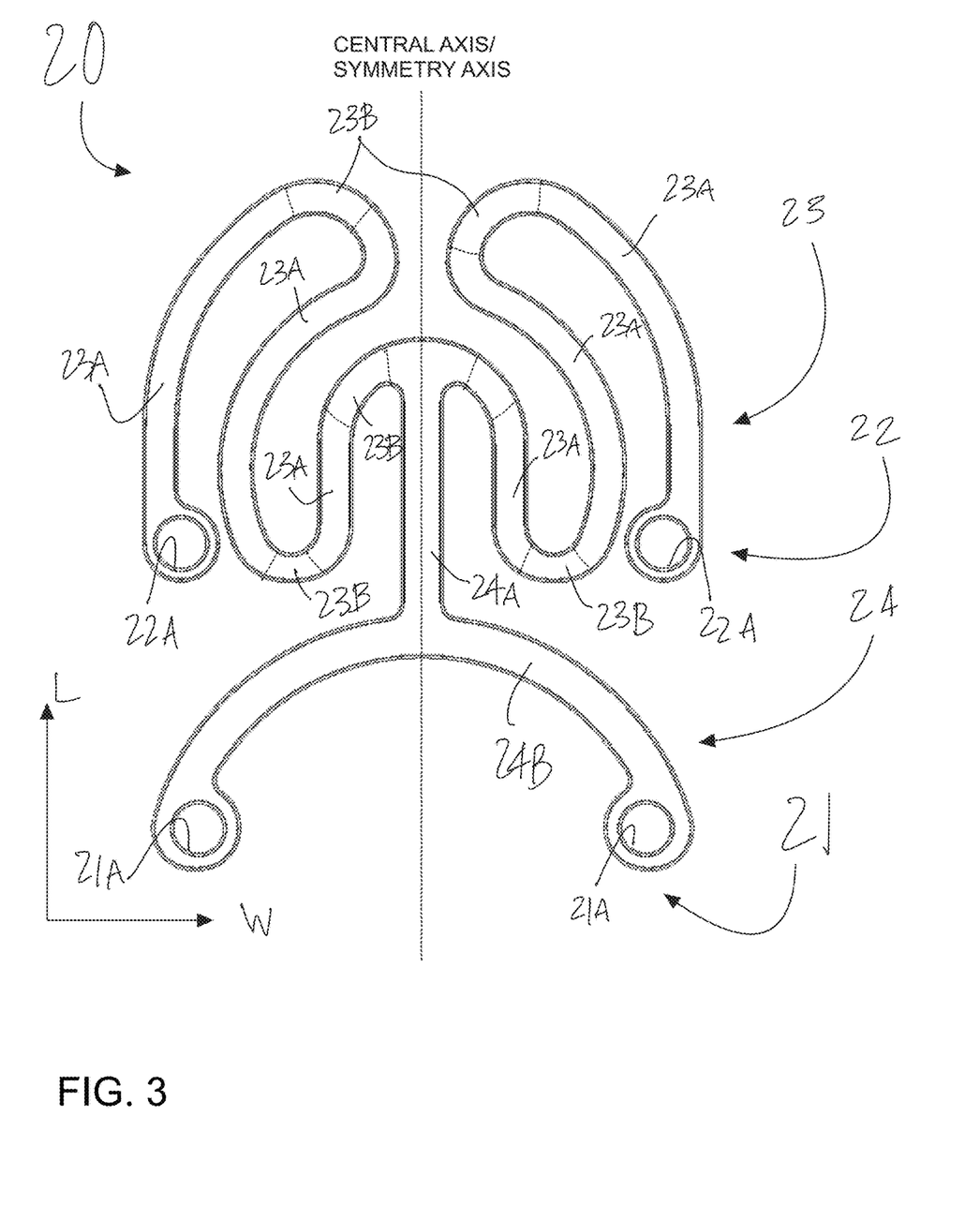
FIG. 3 is an attachment device using the pivot fasteners in accordance with another embodiment of the present disclosure.

Referring to FIG. 3, an exemplary embodiment of the attachment device 20 is provided, which attachment device 20 may be used with pivot fasteners F of the present disclosure. As explained above, the attachment device 20 may or may not be part of the cranioplasty prosthesis 10. For example, the attachment device 20 may be used alone to join a skull to a bone flap, to a prosthetic shell, or to a prosthesis differing from the prosthetic blade 30. The attachment device 20 is designed to allow relative and constrained movement between bone flap, prosthetic shell, or prosthesis covering the opening S, and the skull surface surrounding the opening S. The movement may be described as being mostly out of plane, with a residual bi-directional movement in length L, to which the pivot fasteners F described below may contribute.

The attachment device 20 of FIG. 3 is shown having a planar body and may be made of a sheet material, in a monoblock construction. For example, the attachment device 20 of FIG. 5 may be made of a single sheet of material that may be cut in any appropriate way, such as by laser cutting, CNC machining, casting, etc. For reference, the attachment device 20 may, in a neutral position, lie in a plane defined by the length L and the width W. The neutral position may be a native condition of the attachment device 20. The plane defined by the length L and the width W may be a flat plane, but may also have a curved condition, i.e., a curved plane.

The attachment device 20 has a first connection end 21 and a second connection end 22. The first connection end 21 is defined by a pair of holes 21A that are configured to receive a pivot fastener F of FIG. 5. Fewer or more holes 21A may be present. Likewise, the second connection end 22 also has a pair of holes 22A (or more or fewer) to receive pivot fasteners F of FIG. 5. In an embodiment, the holes 21A are aligned with one another along the width W. Likewise, in an embodiment, the holes 22A are aligned with one another along the width W. Other arrangements are considered. In a variant, the holes 21A and/or the holes 22A have the illustrated circular shape (e.g., straight hole, hole with counterbore, hole with counterbore). Therefore, pivot fasteners F are received in the holes 21A and/or 22A (which ever are present, and which ever require pivot movement), so as to define a rotational joint as described hereinafter. The rotational joints may therefore enable a rotational movement, as described below and shown by R in FIG. 4, about rotational axes H1 that may be generally parallel to height (normal to a plane of the sheet of FIG. 3).

The first connection end 21 and the second connection end 22 are interconnected by a coil portion 23, for instance formed of multiple coils, and by a frame portion 24. The coil portion 23 may also be referred to as a switchback mechanism, with multiple switchbacks. In use, the attachment device 20 has the first connection end 22 secured to the skull S adjacent to the skull opening S1. The second connection end 21 may be connected to a bone flap or prosthesis covering the skull opening S1, such as the prosthetic blade 30. The reverse arrangement is also possible, though not always suitable. While the first connection end 21 I is shown as having holes to be screwed to a component, the first connection end 21 may be integrally connected to the blade portion 30 as shown in FIG. 1.

The coil portion 23 is responsible for allowing out-of-plane movement of the second connection end 22 relative to the first connection end 21, relative to the attachment device 20 in its neutral position (also referred to herein as original condition). The coil portion 23 is configured to constrain movement of the first connection end 21 such that the first connection end 21 is practically superposed in height H with itself. The rotational joints enabled by the pivot fasteners F at the end 22 may contribute to this quasi-superposition. Stated differently, the coil portion 23 is arranged to limit the first connection end 21 to movement along the height H. While the first connection end 21 may also move along length L, the variation in distance along length L when projected onto the neutral plane (i.e., original condition) is substantially less than the variation in distance along height H. Stated differently, the connection ends 21 before and after deformation are generally superposed in height, but considering the radial expansion on a sphere, to do so, the connection ends 21 before and after deformation need to move along the length relative to 22 (diagonally). Seen from above, 21 could look like its only moving along the height. The frame portion 24, on the other end, is between the first connection end 21 and the coil portion 23. The frame portion 24 is a rigid component (i.e., no in-plane deformation) that may optionally be located over the kerf, to force a unidirectional deformation characteristic of the attachment device 20, namely to enable movement upwardly from a neutral condition, as explained below. Thus, movement of the first connection end 21 in the width W direction is limited or negligible, due to the physical constraints imposed by the frame portion 24. As can be observed, the coil portion 23 is connected to the frame portion 24, and the frame portion 24 enables various types of deformation of the coil portion 23, while the frame portion 24 may deform in flexion only, in a variant. Although the movement is described as being that of the first connection end 21, similar behavior may apply to the second connection end 22 from the perspective of the first connection end 21. In use, in an embodiment, it is the second connection end 22 that leads when slid into an incision. Although not necessary, the flaring shape from the leading end to the trailing holes 22A, and the trailing position of the holes 22A relative to a tip of the coil portion 23 in direction-L, limits movement in H, and contributes to maintaining the attachment device 20 planar and moving along the surface of the skull. The flaring shape from the leading end to the trailing holes 22A may be described as being arcuate, or may have other shapes, if present.

The coil portion 23 and frame portion 24 constrain the movements of the ends 21 and 22 relative to one another, by having various components. The coil portion 23 has struts 23A that extend at least partially in the length L direction. The struts 23A may be interconnected by webs 23B. The webs 23B may be shorter than the struts 23A, and may be located at ends of the struts 23A. For example, the webs 23B may be transverse to the struts 23A and may extend at least partially in the width W direction. Therefore, when one of the ends 21 and 22 is subjected to a force, such as that shown in FIG. 6, the webs 23B deform by the leveraging effect of the struts 23A, allowing the out-of-plane movement of the struts 23A. The webs 23B serves as rotational joints (along W), by deformation. Although the struts 23A and webs 23B are described as distinct features, the coil portion 23 may have curved sections that behave as struts 23A and webs 23B, the webs 23B being at junctions with other struts 23A to which the curved sections are connected. Again, the struts 23A and webs 23B may all be made of a single sheet material. In a variant, the webs 23B may be said to exhibit torsion when out-of-plane movement occurs for the struts 23A. In parallel to the torsion of the webs 23B, the struts 23A may exhibit flexion, in the out-of-plane movement. In a variant, any such torsion may be in elastic deformation (though it could also be in plastic deformation). When subjected to a deformation, the attachment device 20 may be defined as a compliant mechanism, i.e., a flexible body that elastically deforms. Moreover, by its configuration, the attachment device 20 may be said to be unidirectional in its displacement from its original condition, in that it may move only in one direction from the original condition (neutral plane), namely toward the deformed condition. In its original condition, the attachment device 20 cannot move in the other direction through normal in-use forces and pressures. Stated differently, the attachment device 20 cannot deform in negative H from the neutral plane/original condition. This is because the frame portion 24 of the attachment device 20 is essentially transverse to and above a kerf between skull and flap, such that the attachment device 20 prevents inward movement of the flap. i.e., depression of the bone flap. The frame portion 24 is shown as having a strut 24A, at the first end of which the coil portion 23 is connected. The coil portion 23 may be said to be divided in two sets of coils from the strut 24A of frame portion 24. In a variant, the strut 24A extends along L. Other arrangements are possible, with pairs of struts 24A, etc. The frame portion 24 may further include a frame member 24B at the end of which are located the connection holes 21A of the first connection end 21. Therefore, there is no coil portion, thus deformation of the frame portion 24 is limited, in contrast to the coil portion 23. This can be observed in FIG. 4.

Figure 4:
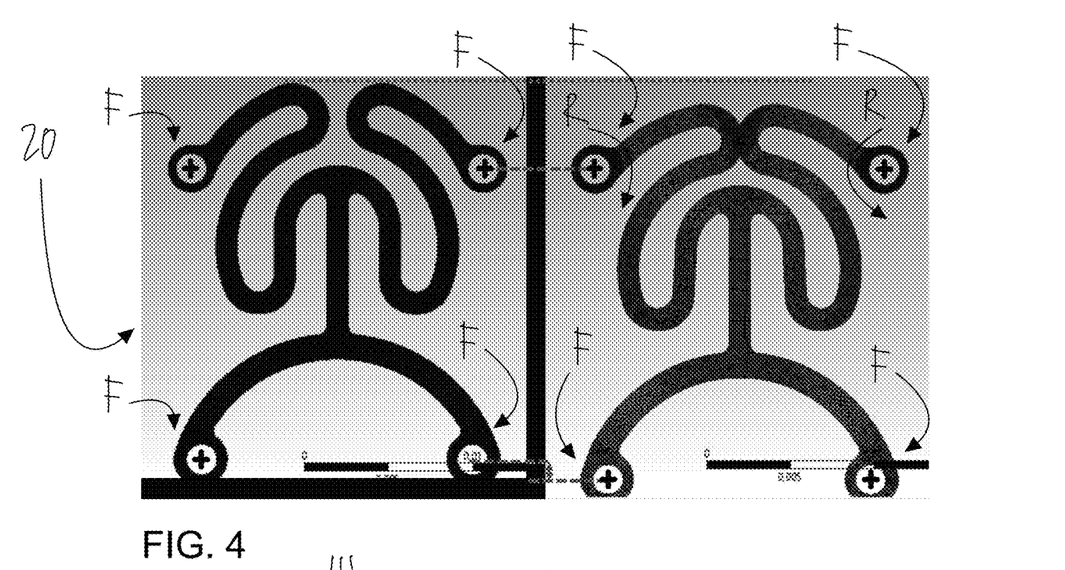
FIG. 4 is a comparative plane view of the attachment device of FIG. 3, as deformed via the pivot fasteners in accordance with another embodiment of the present disclosure.
Figure 5:
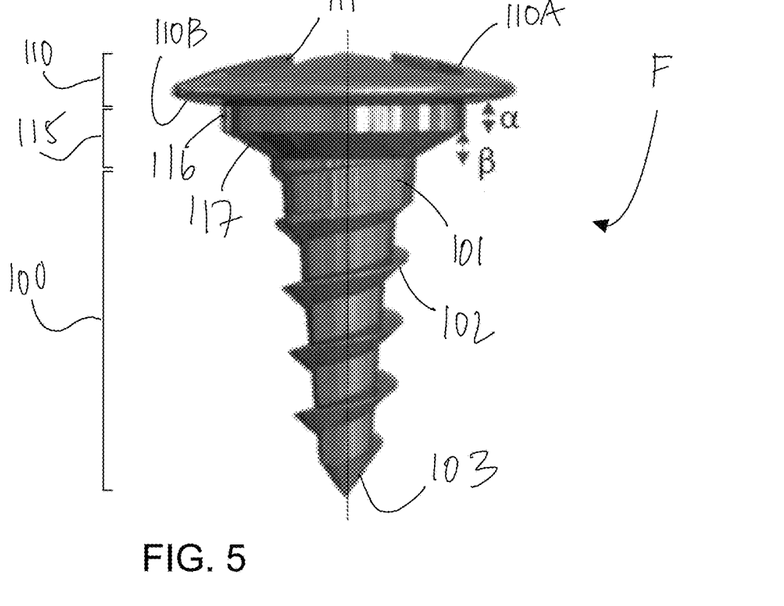
FIG. 5 is an elevation view of the pivot fastener in accordance with the present disclosure.
Figure 6:
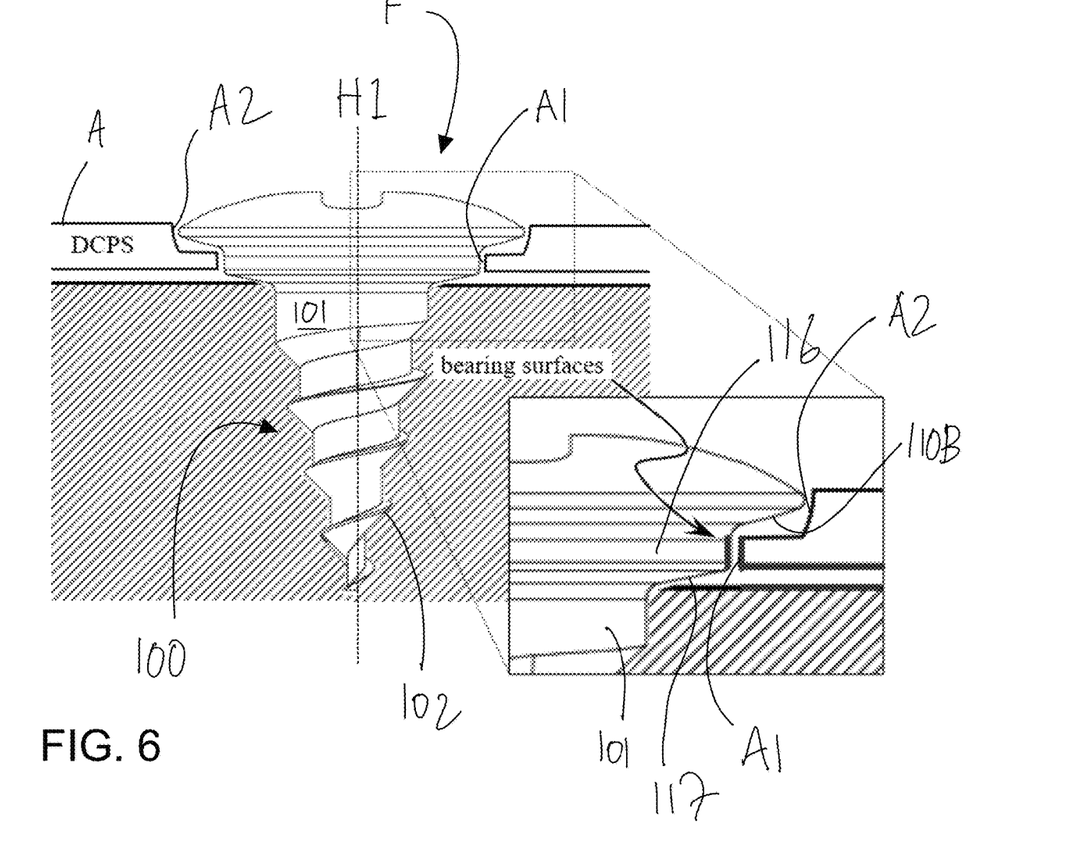
FIG. 6 is an elevation view, partly sectioned, showing the pivot fastener as screwed to the bone and connected to a cranioplasty prosthesis.
Figure 7:
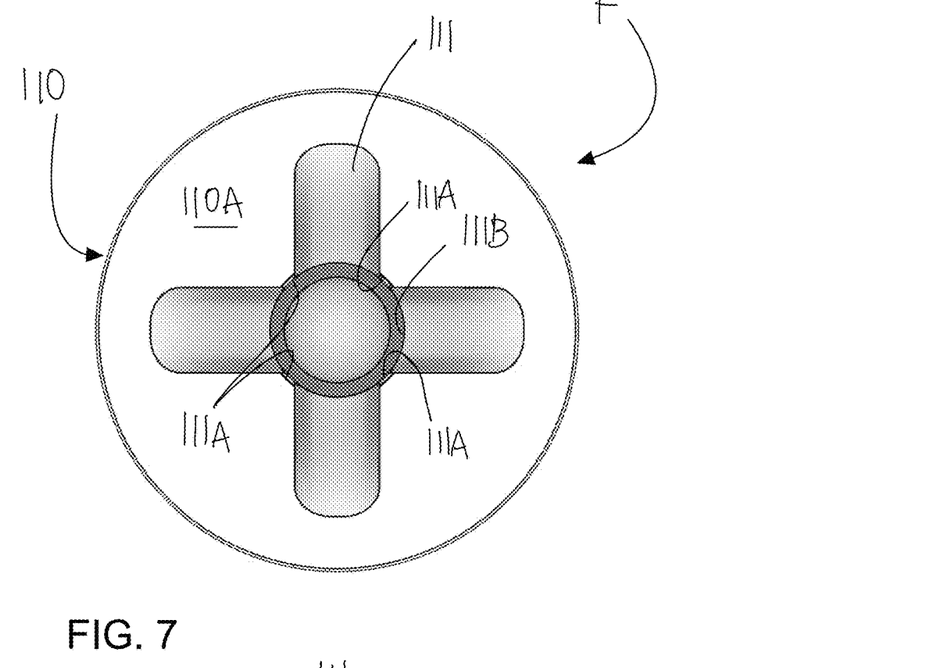
FIG. 7 is a top view of one possible drive configuration for a head of the pivot fastener of FIG. 5.

Indeed, as observed from FIG. 4, the rotational joints at the end 22 with the pivot fasteners F (FIG. 5), enable rotation of the first coil portions in direction R as the attachment device 20 moves out of the neutral plane, i.e., rotation about axes H1 (FIG. 6). This may be possible by the fact that the connection holes 22A are each connected to respective coils of the coil portion 23, referred to as sets above. This rotation results in an expansion of the attachment device 20 along direction L (as can be observed from the side by side views of FIG. 4), contributing to the footprint of the attachment device 20 in the deformed condition to be close to the footprint in the neutral condition. It can also be observed that the coil portion 23 has segments that are in a direction opposite to the connection end 21, relative to a line passing through a center of both the connection holes 22A. This may result in a greater span of movement of the first connection end 21 relative to the second connection end 22.

In a variant, the second connection end 22, i.e., featuring the rotational joints, is on the skull, whereas the first connection end is connected to the flap or to the blade 30. The first connection end 21 has a single member interconnecting the holes 21A, and thus there may not be any substantial rotation at the holes 21A.

By the combination of the various actions, i.e., rotation, torsion, flexion, with deformations occurring in the elastic deformation range, the displacement versus force plot line may exhibit a non-linear behavior (in contrast to spring-based systems complying with Hooke's law), and thus may result in greater displacement to force ratios. This may be useful when relieving intracranial pressure.

The configuration of the attachment device 20 is not limited to that shown in FIGS. 3-4, as any other configuration, such as those described in FIGS. 11A-11C and 12, are contemplated.

Because of the pivoting motion enabled for instance by the pivot fasteners F of the present disclosure, the attachment device 20 is well suited to anchor a prosthesis or bone flap to the skull and allow a dynamic unidirectional movement, i.e., movement essentially limited to displacement of a connection end 21 or 22 in the height H direction, from a neutral plane, and possibly back toward the neutral plane. Accordingly, the attachment device 20 allows displacement of a bone flap or prosthesis as a reaction to intracranial pressure. Consequently, the increase in the cranial volume may limit damages caused by intracranial hypertension. In its neutral position, the attachment device 20 offers its maximum shearing resistance, thereby preventing an inward movement of the bone flap or prosthesis. The flaring shape from the leading end to the holes 22A may also contribute to the prevention of inward movement. The attachment device 20 may be made of any appropriate material that is semi-flexible, biocompatible and/or biodegradable, such as metals and plastics.

The attachment device 20 may be used in a hybrid manner, for instance by use as part of the cranioplasty prosthesis 10 or to connect a bone flap to a remainder of the skull. For example, in the latter scenario, while not as optimal in addressing intracranial pressure issues as with the cranioplasty prosthesis 10 (as the prosthetic blade 30 is substantially thinner than a bone flap), the presence of the attachment device 20 may allow some form of decompression as well.

The attachment device 20 may be used to treat several lesions resulting from traumas, subdural hematomas, subarachnoid hemorrhages, intracerebral hemorrhages, cerebral venous thrombosis, meningitis, empyema, osteomyelitis, hydrocephalus, tumors, or like intracranial disorders. With the cranioplasty prosthesis 10, attachment device 20 and/or prosthetic blade 30 of the present disclosure, it is possible to treat intracranial hypertension with a single surgery. In doing so, risk of complications may be considerably reduced and patient recuperation time may be lessened. Moreover, due to the single intervention, post-surgical complications may be avoided. The cranioplasty prosthesis 10 is a universal and dynamic bone flap prosthesis that may be implanted at the moment of craniotomy or craniectomy. Not only does the cranioplasty prosthesis 10 form an efficient protection against impacts and may cause a reduction in the intracranial pressure, the surgery costs related to the use of the cranioplasty prosthesis 10 may be reduced. The attachment device 20 could conveniently offer enough displacement with the autologous bone flap or a synthetic bone flap as well.

Referring to the drawings and more particularly to FIGS. 5 and 6, one of the pivot fasteners F is shown in greater detail. The pivot fastener F has a body 100, a head 110, and a shoulder 115 between the body 100 and the head 110. The body 100 is the part of the pivot fastener F that penetrates the bone, such as by thread(s). The head 110 remains outside of the bone and has a drive to be interfaced with a tool such as a screwdriver, a robot, a drill, etc, for a rotation to be imparted to the pivot fastener F, for the body 100 to be screwed into or unscrewed from the bone. The shoulder 115 is configured to define a pivot part of a rotational joint with a cranioplasty prosthesis or component thereof, such as described above, and generically referred to as cranioplasty prosthesis component A herein. Therefore, the shoulder 115 may be defined as being a pivot part, a pivot portion, a rotational joint portion, member or component, the rotational joint being a one degree-of-freedom (DOF) rotational joint, though some negligible play may be present between the shoulder 115 and complementary joint component, shown in FIGS. 5 and 6 as being a cranioplasty prosthesis component A, as an example among others. The cranioplasty prosthesis component A may be any cranioplasty prosthesis such as 10, or any part thereof, such as attachment device 20, cranial fixation plate (a.k.a., fixation plate). The shoulder 115 is also used as an abutment to control a depth of penetration of the body 100 in the bone (such as by way of an abutment segment described below). Moreover, the shoulder 115 collaborates with the cranioplasty prosthesis component A to ensure that the cranioplasty prosthesis component A can rotate in most circumstances. The shoulder 115 may prevent the pivot fastener F from blocking rotation of the cranioplasty prosthesis component A regardless of the torque applied by the tool when driving the pivot fastener F in the bone. The cranioplasty prosthesis component A is shown having a hole A1 (FIG. 6) that may be for example any one of the connection holes 21A, 22A in FIG. 3. Moreover, the cranioplasty prosthesis component A may have a counterbore A2 for the hole A1. The use of the counterbore A2 is described hereinbelow. As observed in FIG. 6, the counterbore A2 may not have a perfectly cylindrical shape, with the counterbore defined herein as a flat-bottomed hole of generally circular cross-section that enlarges another coaxial hole A1.

Figure 9:
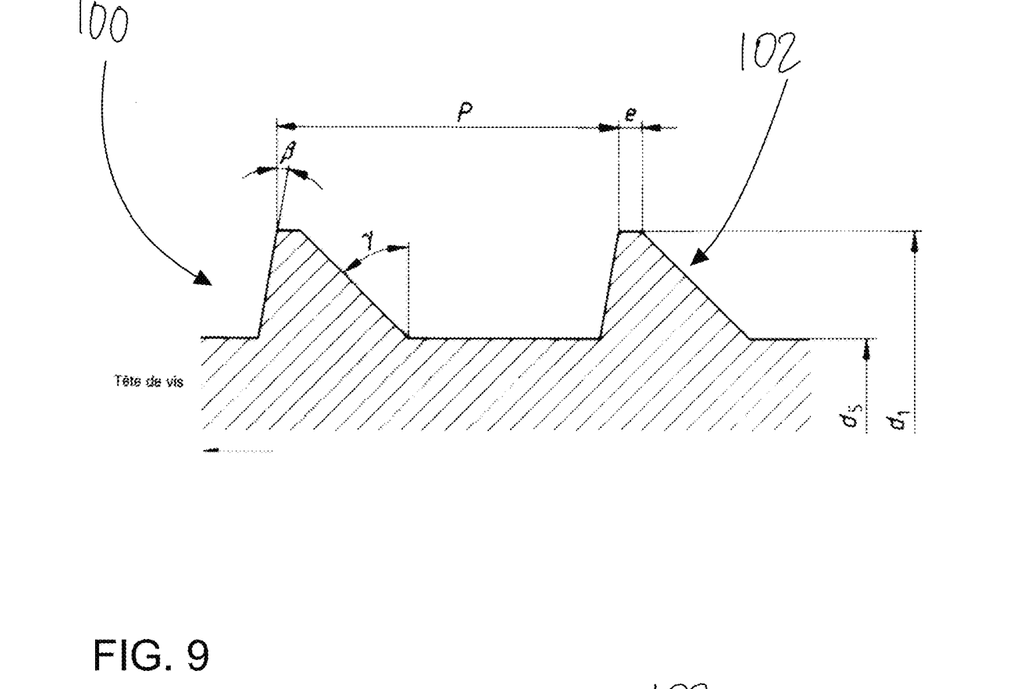
FIG. 9 is a sectional view of a possible configuration of thread portion of the pivot fastener of FIG. 7.
Figure 10:
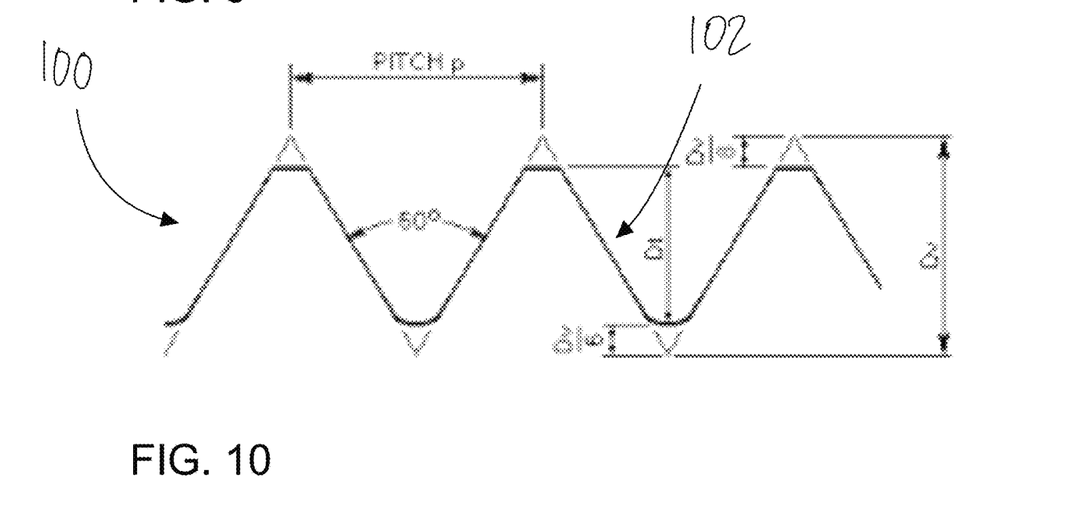
FIG. 10 is a sectional view of another possible configuration of thread portion of the pivot fastener of FIG. 7.

Referring to FIGS. 5, 6, 9 and 10, the body 100 may be of the self-tapping screw type, though this is optional. For example, other screw types or rivet configurations could be used. The body 100 may have a shank 101, having a thread portion defined by one or more threads 102, and a tip 103. As observed in FIG. 5, the shank 101 may have a frustoconical shape as an option, with one or more frustoconical segments, though a cylindrical shank 101 is also considered. The tip 103 may have a conical shape, such as with a cone angle smaller than that of the frustonical segment(s) of the shank 101. Other configurations are possible, such as with a shank 101 that is entirely conical shape, a straight shank, etc. The thread 102 may be of different types, such as asymmetrical (FIG. 9) or symmetrical (FIG. 10). The dimensions and angles shown in FIGS. 9-10 are merely provided as examples. In a variant, a maximum diameter of the shank 101 is 1.50 mm±0.30 mm, although this value is merely given as an example. The maximum diameter of the shank 101 may be less, though one must ensure that the threads 102 are suitably strong for such a purpose, in spite of the small size. The maximum diameter of the shank 101 may be greater, but as one can observe from the description below, the shank 101 may be smaller in cross-section than the shoulder 115, for the shoulder 115 to block further penetration. However, this is optional, as there are other approaches to limit the depth of insertion of the body 100 in the bone. In a variant, the shank 101 and the shoulder 115 are both circular in cross-section, with the shoulder 115 having a diameter that is 1.00 mm±0.25 mm more than a maximum diameter of the shank 101.

Referring to FIGS. 5-8, the head 110 is shown as having a relative low profile, with the top surface 110A of the head 110 being for instance frustospherical. However, other geometries are considered, including a flat top surface 110A. An undersurface 110B of the head 110 may be flat as well, but is shown as having a tapering shape, such as by being either frustoconical or frustospherical, as shapes among others. By having the illustrated shape, the undersurface 110B tapers toward the shoulder 115. As explained hereinbelow, such a taper toward the shoulder 115 may limit the contact surface between the undersurface 110B and that of the cranioplasty prosthesis component A. For example, as shown in FIG. 6, the head 110 may optionally be received in the counterbore A2 of the cranioplasty prosthesis component A (the prosthesis component A could have hole A1 only), in which case the undersurface 110B may contact the surface of the counterbore A2. The presence of the taper for the undersurface 110B prevents a fully planar contact between the head 110 and cranioplasty prosthesis component A, which planar contact could increase friction and hamper rotation between the head 110 and cranioplasty prosthesis component A. The contact between the head 110 and the prosthesis component A may be an edge against surface contact.

The drive 111 is shown as being a cross slot. However, any other drive shape is possible, including hexalobular, slotted, etc. In a variant, it may be more appropriate to have recess type drives to preserve a low profile for the head 110. As observed in FIG. 7, the corners of the slot may be rounded as a result of manufacturing, though this is optional. In a variant, abutment surfaces 111A between the four prongs of the cross may be given a specific shape or dimension to limit play with a screwdriver tool to be received in the drive 111, for instance to define a frictional captive engagement of the screwdriver tool in the drive 111. For example, the abutment surfaces 111A may concurrently be part of a virtual cylinder that would project upwardly from a circular bottom 111B of the recess of the drive 111. The screwdriver tool may likewise be sized to have a complementary tight fitting shape, to limit or avoid slippage between tool and drive 111. Moreover, such complementary shape may contribute to keeping the pivot fastener F at the end of the tool, in a hands free mode. Again, these features are optional as any other drive shape is possible, including hexalobular, slotted, etc.

Figure 8:
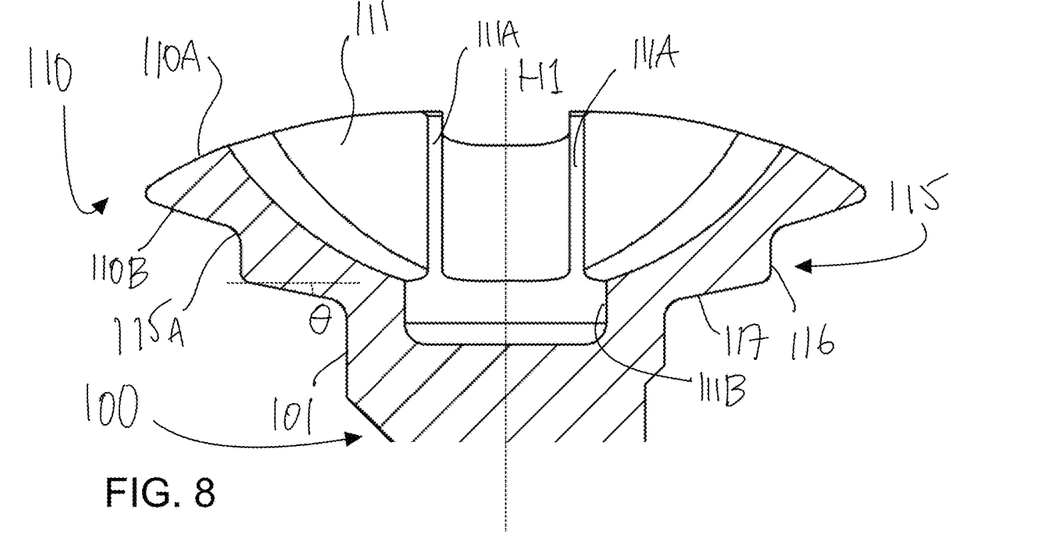
FIG. 8 is a sectional view of the head of the pivot fastener of FIG. 7.

Referring to FIGS. 5, 6 and 8, the shoulder 115 is shown in greater detail, as being between the body 100 and the head 110. While the expression shoulder 115 is used, for reasons observed below based on the function of the shoulder 115, other names could be used for the shoulder 115, such as pivot, hub, abutment, shank. A fillet 115A may be at a junction between the undersurface 110B of the head 110 and the shoulder 115, but the fillet 115A is optional. In a variant, the shoulder 115 may be divided into two segments, i.e., a pivot segment 116 and an abutment segment 117. In a variant, the pivot segment 116 has a substantially cylindrical shape. This cylindrical shape is optional, as the pivot segment 116 could have other shapes, such as frustoconical. The shoulder 115 may have a single segment, such as the pivot segment 116 only, with an end surface of the pivot segment 116 being flat, with the body 100 projecting from such a flat surface, the flat surface being an abutment end. If present, the abutment segment 117 may have a frustoconical shape, as one tapering shape among others (it could also be flat). Moreover, although the abutment segment 117 has a base that has the same diameter as the pivot segment 116, other configurations are possible.

As observed in FIG. 6, the diameter of the pivot segment 116 is sized to be received with play in the hole A1 of the cranioplasty prosthesis component A. Stated differently, an annular gap may be present as being defined between a circumferential surface of the hole A1, and a circumferential surface of the pivot segment 116, which circumferential surface may be referred to as a bearing surface. As both the hole A1 and the pivot segment 116 are circular, the cranioplasty prosthesis component A may rotate relative to the relative to the pivot fastener F, about axis H1. Therefore, the diametrical dimensions of the hole A1 and of the pivot segment 116 are selected to enable rotation. This may also include providing the shoulder 115 with a height (i.e., along axis H1, that is greater than a thickness of the component A at the connection hole A1. As another possibility, the distance or height (along H1) between the surface portion of the head 110B, where it will be in contact with the surface of the implant A2, and the surface of the bone is greater than a thickness of the prosthesis component A, to allow rotation with limited friction.

Likewise, if the counterbore A2 is present and if the head 110 has a circular shape as illustrated, an annular gap may be present as being defined between a circumferential surface of the counterbore A2, and a circumferential edge of the head 110. As both the counterbore A2 and the head 110 are circular in such an embodiment, these complementary features do not prevent rotation of the cranioplasty prosthesis component A relative to the relative to the pivot fastener F, about axis H1. Therefore, the diametrical dimensions of the counterbore A2 and of the pivot segment head 110 are selected to enable rotation. When the expression "gap" is used to describe the relation between the pivot segment 116 and the hole A1, and between the counterbore A2 and the pivot segment head 110, it is to describe sufficient clearance to enable rotation between the pivot fastener F and the prosthesis component A.

It can also be observed that the abutment segment 117 contacts the bone, and serves as an abutment that opposes a force against any further penetration of the pivot fastener F into the bone. The optional frustoconical shape of the abutment segment 117 may oppose a gradual block to the penetration of the pivot fastener F into the bone. The optional frustoconical shape of the abutment segment 117 may help to orient/align the insertion of the body 100 to respect the concentricity of hole A and surface 116. The abutment segment 117 in contact with taper surface A2 may help ensure concentricity, though this is optional. In a variant, observed in FIG. 8, an angle θ of the abutment segment is of at most 45 degrees inclusively, and is more than 0 degree. However there may not be an angle θ, i.e., e is equal to 0 degree. The angle θ of the abutment segment may be described as a tapering angle, and may be defined as being an angle between a plane to which a vector of axis H1 (i.e., a central axis of the shoulder 115) is normal, and a tapering surface of the abutment segment 117.

The head 110 must have greater cross-sectional features than the shoulder 115, for the head 110 to block an axial displacement of the cranioplasty prosthesis component A out of engagement with the shoulder 115. In a variant, the head 110 and the shoulder 115 are both circular, with the shoulder 115 having a diameter that is 0.90 mm±0.25 mm less than that of the head 110. Other configurations are possible.

The total length of the pivot fastener F may vary. For example, the total length may be of at least 3.00 mm. Other lengths may be used, such that a user may select a length as a function of bone depth. If the pivot fastener F is used with other types of prostheses, the length may be substantially longer than 3.00 mm.

Figure 11A:
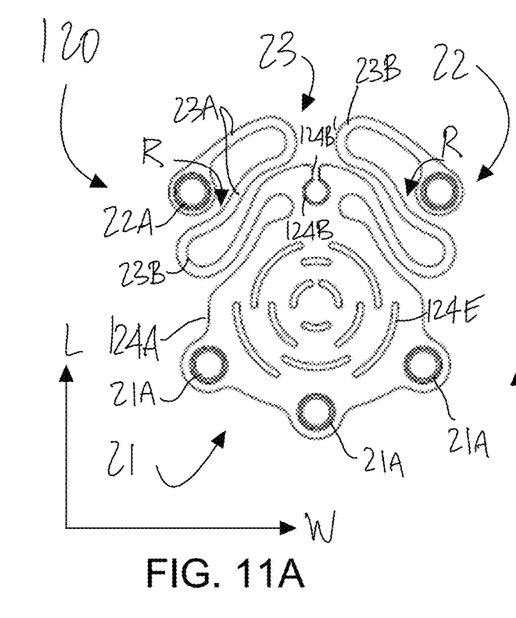
FIGS. 11A-11C are plan views of attachment devices in accordance with another aspect of the present disclosure.
Figure 11B:
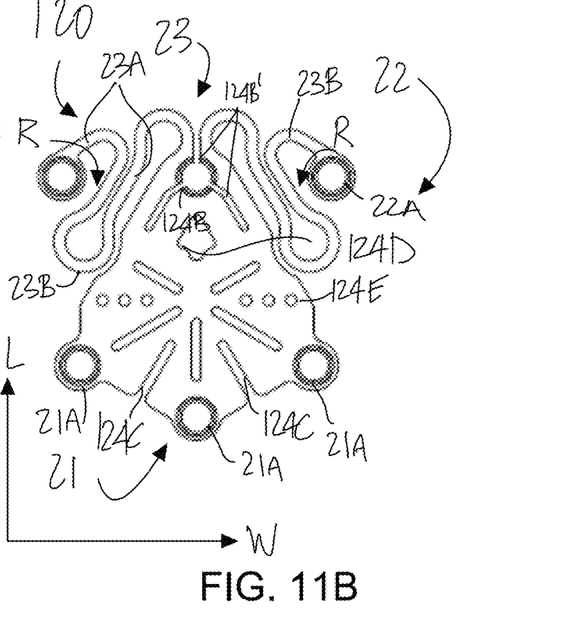
Figure 11C:
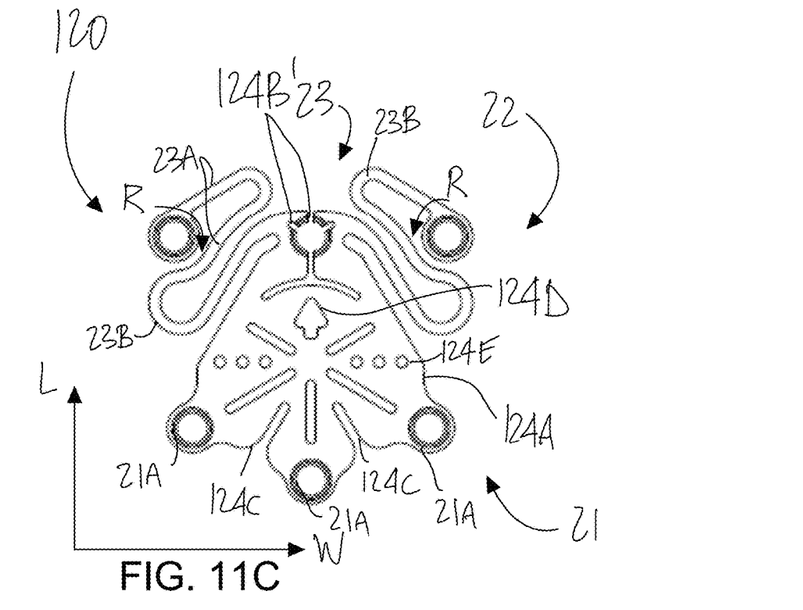

Referring to FIGS. 11A-11C, exemplary embodiments of the attachment device 120 are provided. The attachment devices 120 may or may not be used with pivot fasteners F described herein. The attachment devices 120 may or may not be part of the cranioplasty prosthesis 10. For example, the attachment devices 120 may be used alone to join a skull to a bone flap, to a prosthetic shell, or to a prosthesis differing from the prosthetic blade 30. The attachment devices 120 are designed to allow relative and constrained movement between bone flap, prosthetic shell, or prosthesis covering the opening S, and the skull surface surrounding the opening S. The movement may be described as being mostly out of plane, with a residual bi-directional movement in length L, to which the pivot fasteners F described herein may contribute, though other types of fasteners may be used.

The attachment devices 120 of FIGS. 11A-11C are shown having a planar body and may be made of a sheet material, in a monoblock construction. For example, the attachment devices 120 may be made of a single sheet of material that may be cut in any appropriate way, such as by laser cutting, CNC machining, casting, etc. For reference, the attachment devices 120 may, in a neutral position, lie in a plane defined by the length L and the width W. The neutral position may be a native condition of the attachment devices 120. The plane defined by the length L and the width W may be a flat plane, but may also have a curved condition, i.e., a curved plane.

Like the attachment device 20 described with reference to FIG. 3 above, the attachment devices 120 may each have a first connection end 21 and a second connection end 22. For comparative description, like reference numerals are shared between the attachment device 20 and the attachment devices 120. The first connection end 21 is defined by holes 21A that are configured to receive a pivot fastener, such as the pivot fastener F of FIG. 5 as an example. In the attachment device 120, there may or may not be any rotation at the pivot fasteners F, depending on the use. Fewer or more holes 21A may be present than the three shown in FIGS. 11A-11C. The second connection end 22 also has a pair of holes 22A (or more or fewer) to receive pivot fasteners, optionally the pivot fasteners F of FIG. 5. In an embodiment, the holes 22A are aligned with one another along the width W. Other arrangements are considered. In a variant, the holes 21A and/or the holes 22A have the illustrated circular shape (e.g., straight hole, hole with counterbore, hole with counterbore). Therefore, pivot fasteners may be received in the holes 21A and/or 22A (whichever are present, and whichever require pivot movement), and may define a rotational joint as described above. The rotational joints may therefore enable a rotational movement as shown by R, about rotational axes that may be generally parallel to height (normal to a plane of the sheet of FIGS. 11A-11C). However, the rotational movement is optional and in some configurations, there is no rotation.

The first connection end 21 and the second connection end 22 are interconnected by a coil portion 23, for instance formed of multiple coils, and by a frame portion 24. The coil portion 23 may also be referred to as a switchback mechanism, with multiple switchbacks. In use, the attachment devices 120 each have the connection end 22 secured to the skull S adjacent to the skull opening S1. The connection end 21 may be connected to a bone flap or prosthesis covering the skull opening S1, such as the prosthetic blade 30. The reverse arrangement is also possible, though not always suitable. While the connection end 21 is shown as having holes to be screwed to a component, the connection end 21 may be integrally connected to the blade portion 30 in a manner similar to that shown in FIG. 1.

The coil portion 23 is responsible for allowing out-of-plane movement of the second connection end 22 relative to the first connection end 21, relative to the attachment device 120 in its neutral position (also referred to herein as original condition). The coil portion 23 is configured to constrain movement of the first connection end 21 such that the first connection end 21 is practically superposed in height H with itself. The rotational joints enabled by the pivot fasteners at the end 22 may contribute to this quasi-superposition. Stated differently, the coil portion 23 is arranged to limit the first connection end 21 to movement along the height H. While the first connection end 21 may also move along length L, the variation in distance along length L when projected onto the neutral plane (i.e., original condition) is substantially less than the variation in distance along height H. The frame portion 24, on the other end, is between the first connection end 21 and the coil portion 23. The frame portion 24 is a rigid component (i.e., no in-plane deformation) that may optionally be located over the kerf, to force a unidirectional deformation characteristic of the attachment device 20, namely to enable movement upwardly from a neutral condition, as explained below. Thus, movement of the first connection end 21 in the width W direction is limited or negligible, due to the physical constraints imposed by the frame portion 24. As can be observed, the coil portion 23 is connected to the frame portion 24, and the frame portion 24 enables various types of deformation of the coil portion 23, while the frame portion 24 may deform in flexion only, in a variant. Although the movement is described as being that of the first connection end 21, similar behavior may apply to the second connection end 21 from the perspective of the first connection end 21. In use, in an embodiment, it is the second connection end 22 that leads when slid into an incision. Although not necessary, the flaring shape from the leading end to the trailing holes 22A, and the trailing position of the holes 22A relative to a tip of the coil portion 23 in direction-L, limits movement in H, and contributes to maintaining the attachment device 20 planar and moving along the surface of the skull. The flaring shape from the leading end to the trailing holes 22A may be described as being arcuate, or may have other shapes, if present.

The coil portion 23 and frame portion 24 constrain the movements of the ends 21 and 22 relative to one another, by having various components. The coil portion 23 has struts 23A that extend at least partially in the length L direction. The struts 23A may be interconnected by webs 23B. The webs 23B may be shorter than the struts 23A, and may be located at ends of the struts 23A. For example, the webs 23B may be transverse to the struts 23A and may extend at least partially in the width W direction. Therefore, when one of the ends 21 and 22 is subjected to a force, the webs 23B deform by the leveraging effect of the struts 23A, allowing the out-of-plane movement of the struts 23A. The webs 23B serves as rotational joints (along W), by deformation. Although the struts 23A and webs 23B are described as distinct features, the coil portion 23 may have curved sections that behave as struts 23A and webs 23B, the webs 23B being at junctions with other struts 23A to which the curved sections are connected. Again, the struts 23A and webs 23B may all be made of a single sheet material. In a variant, the webs 23B may be said to exhibit torsion when out-of-plane movement occurs for the struts 23A. In parallel to the torsion of the webs 23B, the struts 23A may exhibit flexion, in the out-of-plane movement. In a variant, any such torsion may be in elastic deformation (though it could also be in plastic deformation). When subjected to a deformation, the attachment devices 120 may be defined as a compliant mechanism, i.e., a flexible body that elastically deforms. Moreover, by their configuration, the attachment devices 120 may be said to be unidirectional in their displacement from their original condition, in that they may move only in one direction from the original condition (neutral plane), namely toward the deformed condition. In their original condition, the attachment devices 120 cannot move in the other direction through normal in-use forces and pressures. Stated differently, the attachment devices 120 cannot deform in negative H from the neutral plane/original condition. This is because the frame portion 24 of the attachment devices 120 is essentially transverse to and above a kerf between skull and flap, such that the attachment device 120 prevents inward movement of the flap. i.e., depression of the bone flap.

In contrast to the frame portion 24 of the attachment device 20 of FIG. 3, the frame portion 24 of the attachment devices 120 of FIGS. 11A-11C are shown as having a plate body 124A, at the end of which the coil portion 23 is connected. The coil portion 23 may be said to be divided in two sets of coils from the frame portion 24. The plate body 124A has no coil portion, thus deformation of the frame portion 24 is limited, in contrast to the coil portion 23. A connection hole 124B may be at a junction between the two sets of coil portions 23, with the connection hole 124B optionally receiving a pivot fastener. It can be observed that an optional slot 124B' may be present in the periphery of the connection hole 124B, such that the connection hole 124B has a disruption in its periphery. This slot 124B', or other separation, may allow the attachment devices 120 to deform and conform to the shape of the bone, at the connection hole 124B, and/or at the junction between the coil portions 23. It can also be observed from FIGS. 11B and 11C that additional slots 124B' may be present for the connection hole 124B. In addition, the slots 124B' may form an additional switchback mechanism, and may thus be said to be hybridized in function. Likewise, slots 124C may be present adjacent to the holes 21A. again with a view to allow a conforming of the attachment devices 120 to a geometry (i.e., 3D shape) of the bone, flap, etc, against which the connection end 21 will be applied (if applied). These slots 124B' and/or 124C may reduce the radio-opacity footprint of the attachment devices 120, thereby contributing to an enhanced imaging. Moreover, the slots 124B' and/or 124C reduce the weight of metallic material of the attachment devices 120, and this may have a positive impact on temperature control when some imaging modalities are used, such as MRI. The slots 124B' may be present without the slots 124C being present, and vice versa. If fasteners other than the pivot fastener F are used in some of the connection holes, the prosthesis may become non-dynamic and the coil sections may be blocked from deformation, giving the possibility of the plate to act as a rigid plate.

Referring to FIGS. 11B and 11C, it can be observed that cutouts 124D may be present in the plate body 124A, which cutouts 124D may be visible through imaging, and which cutouts 124D may provide user guidance. For examples, the cutouts 124D may be in the form of arrows as in FIGS. 11B and 11C, to indicate for example a direction of insertion of the attachment devices 120. Any other form of indicia (e.g., letters, numbers) may be defined by a cutout 124D, for different reasons. For example, the cutout 124D could be representative of a size, of an orientation (e.g., to indicate what surface of the plate body 124A should face away from the skull), etc. Cutouts 124D may be present with or without slots 124B' and/or slots 124C.

Other types of cutouts 124E may be used to indicate the location of the kerf, or other anatomical landmark. For example, FIG. 11A shows a target-style geometry in which numerous cutouts 124E end at an imaginary line W1, while FIG. 11B shows a series of points that are along such line W1. Other geometries, and shapes are possible. Cutouts 124E may be present with or without slots 124B' and/or slots 124C and/or cutouts 124D.

Figure 12:
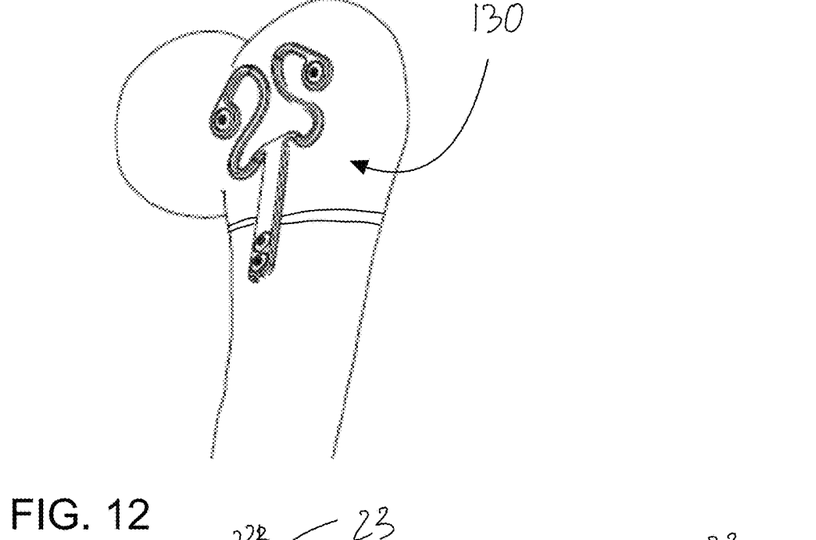
FIG. 12 is a perspective view of an attachment device in accordance with another aspect of the present disclosure.
Figure 13:
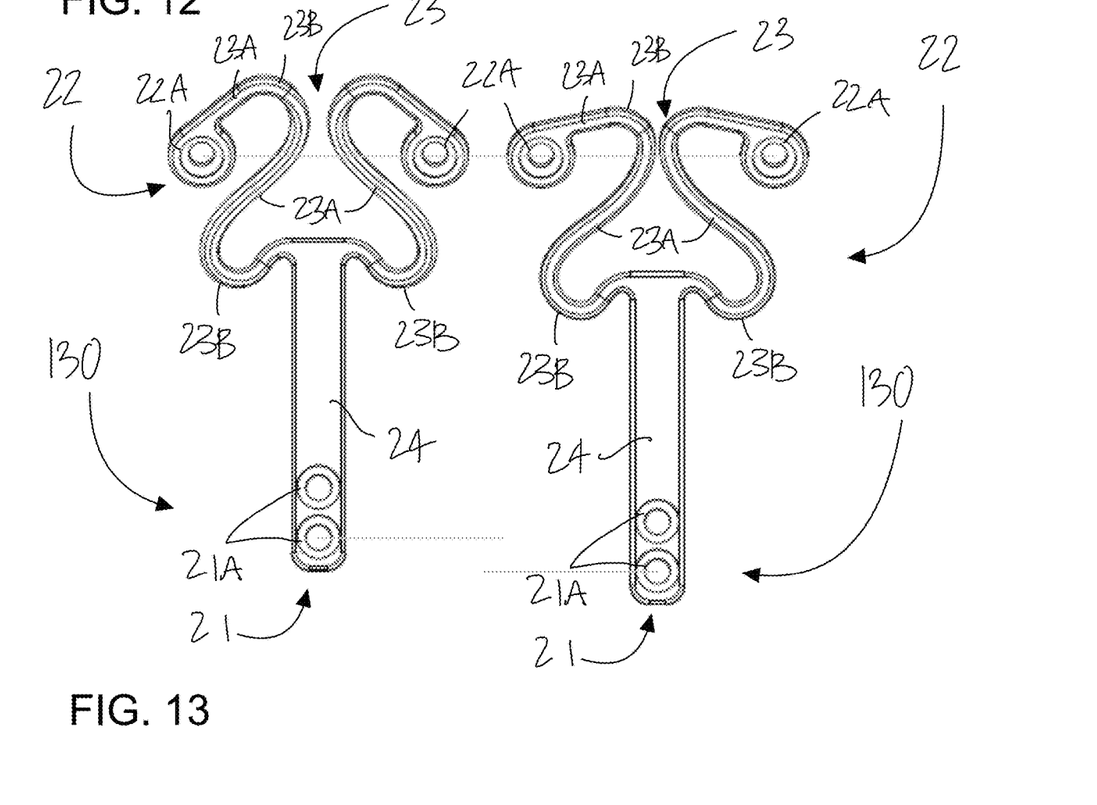
FIG. 13 is a comparative plan view of the attachment device of FIG. 12, as deformed via the pivot fasteners in accordance with another embodiment of the present disclosure.

In FIGS. 12 and 13, another embodiment of the attachment device is shown as 130. The attachment device 130 is of the type that may be used in other types of orthopedic procedures, such as for bone distraction in distraction osteogenesis. The attachment device 130 may or may not be used with pivot fasteners F described herein. The attachment device 130 is designed to allow relative and constrained movement between two bone segments, for example. The movement may be described as being along length L, to which the pivot fasteners F described herein may contribute, though other types of fasteners may be used.

The attachment device 130 is shown having a planar body and may be made of a sheet material, in a monoblock construction. For example, the attachment device 130 may be made of a single sheet of material that may be cut in any appropriate way, such as by laser cutting, CNC machining, casting, etc. For reference, the attachment device 130 may, in a neutral position, lie in a plane defined by the length L and the width W. The neutral position may be a native condition of the attachment device 130. The plane defined by the length L and the width W may be a flat plane, but may also have a curved condition, i.e., a curved plane. As observed in FIG. 12, it can be formed to conform to the shape of a bone, herein a femur as an example.

Like the attachment device 20 described with reference to FIG. 3 above, the attachment device 130 may have a first connection end 21 and a second connection end 22. For comparative description, like reference numerals are shared between the attachment device 20 and the attachment devices 120. The first connection end 21 is defined by holes 21A that are configured to receive a pivot fastener, such as the pivot fastener F of FIG. 5 as an example. Fewer or more holes 21A may be present than the two shown in FIGS. 12-13. The second connection end 22 also has a pair of holes 22A (or more or fewer) to receive pivot fasteners, optionally the pivot fasteners F of FIG. 5, thereby forming rotational joints (i.e., one rotational DOF joint). In an embodiment, the holes 22A are aligned with one another along the width W. Other arrangements are considered. In a variant, the holes 21A and/or the holes 22A have the illustrated circular shape (e.g., straight hole, hole with counterbore, hole with counterbore). Therefore, pivot fasteners may be received in the holes 21A and/or 22A (whichever are present, and which-ever require pivot movement), and may define a rotational joint as described above. The rotational joints may therefore enable a rotational movement as shown by R, about rotational axes that may be generally parallel to height (normal to a plane of the sheet of FIGS. 12-13).

The first connection end 21 and the second connection end 22 are interconnected by a coil portion 23, for instance formed of multiple coils, and by a frame portion 24. The coil portion 23 may also be referred to as a switchback mechanism, with multiple switchbacks. The switchback mechanism allows rotational movement as described below, which rotational movement allows a longitudinal expansion of the attachment device 130 as described below. In contrast to other embodiments, the lower number of coils in the attachment device 130 may result in expansion only, not out of plane movement.

Thus, the coil portion 23 is responsible for allowing in-plane expansion and/or contraction movement of the second connection end 22 relative to the first connection end 21, relative to the attachment device 130 in its neutral position (also referred to herein as original condition). The coil portion 23 is configured to constrain movement of the first connection end 21 such that the first connection end 21 may move along direction L. The rotational joints enabled by the pivot fasteners at the end 22 may contribute to this length expansion. The frame portion 24 is between the first connection end 21 and the coil portion 23. The frame portion 24 is a rigid component (i.e., no in-plane deformation) that may optionally be located over a separation line (e.g., kerf) between two bone segments, to interconnect the bone segments, while allowing movement between them in expansion or contraction, while preventing or limiting other movements. In another use, the frame portion 24 and its absence of in-plane deformation may optionally be located over an epiphyseal line for orthopedic purpose, to control or limit unwanted growth (not only for fractured bones). Thus, movement of the first connection end 21 in the width W direction is limited or negligible, due to the physical constraints imposed by the frame portion 24. As can be observed, the coil portion 23 is connected to the frame portion 24, and the frame portion 24 enables various types of deformation of the coil portion 23, while the frame portion 24 may deform in flexion only, in a variant. Although the movement is described as being that of the first connection end 21, similar behavior may apply to the second connection end 21 from the perspective of the first connection end 21.

The coil portion 23 and frame portion 24 constrain the movements of the ends 21 and 22 relative to one another, by having various components. Another function rendered possible by way of the coil portion 23 is that in certain configurations (such as shown in FIG. 13), the total in-plane displacement may be limited by the interaction of two or more webs/struts which may collide effectively (and predictably) to impede any additional movement, in a stopper-like manner. The coil portion 23 has struts 23A that extend at least partially in the length L direction. The struts 23A may be interconnected by webs 23B. The webs 23B may be shorter than the struts 23A, and may be located at ends of the struts 23A. For example, the webs 23B may be transverse to the struts 23A and may extend at least partially in the width W direction. Therefore, when one of the ends 21 and 22 is subjected to a force, the webs 23B deform by the leveraging effect of the struts 23A, allowing the out-of-plane movement of the struts 23A. The webs 23B serve as rotational joints (along W), by deformation. Although the struts 23A and webs 23B are described as distinct features, the coil portion 23 may have curved sections that behave as struts 23A and webs 23B, the webs 23B being at junctions with other struts 23A to which the curved sections are connected. Again, the struts 23A and webs 23B may all be made of a single sheet material. In a variant, the webs 23B may be said to exhibit torsion when out-of-plane movement occurs for the struts 23A. In parallel to the torsion of the webs 23B, the struts 23A may exhibit flexion, in the out-of-plane movement. In a variant, any such torsion may be in elastic deformation (though it could also be in plastic deformation). When subjected to a deformation, the attachment device 130 may be defined as a compliant mechanism, i.e., a flexible body that elastically deforms. Moreover, by its configuration, the attachment device 130 may be said to be unidirectional in its displacement from its original condition, in that it may move only in one direction from the original condition (neutral plane), namely toward the deformed condition. In its original condition, the attachment device 130 cannot move in the other direction through normal in-use forces and pressures. Stated differently, the attachment device 130 cannot deform in negative H from the neutral plane/original condition. This is because the frame portion 24 of the attachment device 130 is essentially transverse to and above a separation line between bone segments, such that the attachment device 130 prevents inward movement of a bone segment.

In contrast to the frame portion 24 of the attachment device 20 of FIG. 3, the frame portion 24 is shown as being a straight elongated portion. The coil portion 23 may be said to be divided in two sets of coils from the frame portion 24. The frame portion 24 has no coil portion, thus deformation of the frame portion 24 is limited, in contrast to the coil portion 23. Although the frame portion 24 has a straight elongated shape, other shapes are considered. The illustrated elongated shape of the frame portion 24 is particularly well suited to be applied against a long bone, such as along the diaphysis of the bone.

Therefore, the above description pertains to an assembly that may include a cranioplasty prosthesis component having at least one connection hole; and a pivot fastener, the pivot fastener having a body being threaded and adapted to be screwed to cranium bone, a head having a drive, and a shoulder between the body and the head, the shoulder having a circular section; wherein a diametrical dimension of the circular section is less than a diametrical dimension of the connection hole, such that the shoulder forms a rotational joint with the cranioplasty component when the shoulder is in the connection hole. Moreover, while the present application describes the use of the pivot fastener F with a cranioplasty prosthesis, the pivot fastener F may be used with other types of implants, in particular implants that need to be anchored to a bone, and that may require rotational movement. Implants and prostheses used in orthopedics could be used with one or more pivot fasteners F.

Accordingly, the present disclosure may pertain to assembly comprising a prosthesis component having at least one connection hole; and a pivot fastener, the pivot fastener having a body adapted to be received in cranium bone, a head and a shoulder between the body and the head, the shoulder having a circular section; wherein a diametrical dimension of the circular section is less than a diametrical dimension of the connection hole, such that the shoulder forms a rotational joint with the prothesis component when the shoulder is in the connection hole.

The above description is meant to be exemplary only, and one skilled in the art will recognize that changes may be made to the embodiments described without departing from the scope of the invention disclosed. Cone portions described herein (e.g., frustoconical portions) are for right circular cones. Still other modifications which fall within the scope of the present invention will be apparent to those skilled in the art, in light of a review of this disclosure, and such modifications are intended to fall within the appended claims.

The invention claimed is:

1. An implant for use between two bone segments, the implant comprising:
    a body extending in a plane defined by a length and a width, the body having
    a first connection end and a second connection end, each configured to connect to a respective bone segment, wherein the first connection end defines at least one connection hole configured to receive a pivot fastener to form a rotational joint with the fastener, and
    a deformable portion operable to respond to a rotation at the first connection end about an axis transverse to the length,
    wherein the deformable portion, responsive to the rotation, is configured to deform to cause a displacement of the connection ends relative to one another along the length within the plane, and
    wherein the displacement results in an increase in separation between the connection ends.

2. The implant of claim 1, including the pivot fastener.

3. The implant of claim 1, wherein the deformable portion includes a compliant structure arranged to deform by torsion and/or flexion.

4. The implant of claim 3, wherein the compliant structure includes curved sections serving as rotational joints.

5. The implant of claim 4, wherein the curved sections are arranged in switchbacks.

6. The implant of claim 1, wherein the body has a planar shape constraining the displacement to expand substantially lengthwise from an initial configuration.

7. The implant of claim 1, wherein the deformable portion is defined by curved sections.

8. The medical implant of claim 7, wherein the curved sections are defined by struts and webs, the struts extending at least partially along the length of the implant.

9. The implant of claim 8, wherein the webs are configured to undergo flexional deformation in response to a rotational movement of the curved sections.

10. The implant of claim 8, wherein the webs extend at least partially along the width of the implant.

11. The implant of claim 1, further comprising a frame portion located between the deformable portion and the second connecting end, the frame portion being configured to limit deformation within the plane.

12. The implant of claim 11, wherein the frame portion comprises a straight segment aligned along the length of the implant.

13. The implant of claim 12, wherein the deformable portion includes at least one coil portion, wherein the frame portion is between the first connection end and the coil portion.

14. The implant of claim 1, wherein the second connecting end defines at least one connection hole configured to receive a fastener.

15. The implant of claim 2, wherein the pivot fastener has a fastener body configured to be received in bone, and a shoulder having a circular section, the shoulder dimensioned to form a rotational joint with the implant at the connection hole.

16. The implant of claim 15, wherein the pivot fastener includes a head, the shoulder being between the fastener body and the head.

17. The implant of claim 15, wherein a diametrical dimension of the circular section is less than a diametrical dimension of the connection hole, such that the shoulder forms a rotational joint with the prothesis component when the shoulder is in the connection hole.

18. The implant of claim 1, wherein the implant is symmetrical along a line parallel to the length.

19. The implant of claim 1, wherein the body is monolithically formed from a sheet of biocompatible material.

20. The implant of claim 1, wherein the deformable portion is configured to permit unidirectional expansion along the length.

* * * * *